US007965925B2

(12) United States Patent
Eder et al.

(10) Patent No.: US 7,965,925 B2
(45) Date of Patent: Jun. 21, 2011

(54) WATER-STEAM CUTTING PROCESS AND TORCH THEREFOR

(75) Inventors: Alexander Eder, St. Thomas bei Waizenkirchen (AT); Heribert Pauser, Grafenwörth (AT); Florian Silbermayr, Eberstalzell (AT); Alexander Speigner, Wels (AT)

(73) Assignee: FRONIUS International GmbH, Pettenbach (AT)

( * ) Notice: Subject to any disclaimer, the term of this patent is extended or adjusted under 35 U.S.C. 154(b) by 693 days.

(21) Appl. No.: 11/990,047

(22) PCT Filed: Aug. 30, 2006

(86) PCT No.: PCT/AT2006/000356
§ 371 (c)(1),
(2), (4) Date: Feb. 5, 2008

(87) PCT Pub. No.: WO2007/028179
PCT Pub. Date: Mar. 15, 2007

(65) Prior Publication Data
US 2010/0166395 A1 Jul. 1, 2010

(30) Foreign Application Priority Data
Sep. 9, 2005 (AT) ................................ A 1480/2005

(51) Int. Cl.
*A01G 13/06* (2006.01)

(52) U.S. Cl. ........................................ 392/387; 392/386

(58) Field of Classification Search ........................ None
See application file for complete search history.

(56) References Cited

U.S. PATENT DOCUMENTS

| | | | | |
|---|---|---|---|---|
| 3,567,898 | A | 3/1971 | Fein | |
| 3,830,428 | A | 8/1974 | Dyos | |
| 4,317,984 | A | 3/1982 | Fridlyland | |
| 4,987,285 | A * | 1/1991 | Dallavalle et al. | 219/121.54 |
| 5,609,777 | A * | 3/1997 | Apunevich et al. | 219/121.48 |
| 5,717,187 | A * | 2/1998 | Rogozinski et al. | 219/121.54 |
| 5,756,960 | A * | 5/1998 | Rogozinski et al. | 219/121.54 |
| 6,133,543 | A * | 10/2000 | Borowy et al. | 219/121.57 |
| 6,326,581 | B1 | 12/2001 | Laimer et al. | |

FOREIGN PATENT DOCUMENTS

| | | |
|---|---|---|
| AT | 406 559 | 6/2000 |
| EP | 1 050 200 | 11/2000 |
| EP | 1 522 371 | 4/2005 |
| WO | WO 99/38365 | 7/1999 |
| WO | WO 2006/100701 | 9/2006 |

OTHER PUBLICATIONS

International Search Report.

* cited by examiner

*Primary Examiner* — Thor S Campbell
(74) *Attorney, Agent, or Firm* — Collard & Roe, P.C.

(57) ABSTRACT

The invention describes a method for transforming a liquid (8) into a gaseous state for a cutting process with a water-steam cutting device (1), consisting of a torch (6), an evaporator (25), an energy supply and a supply line (31) for a liquid (8), an appropriate temperature (27) being generated for evaporation of the liquid (8). To create a method of this type it is now provided that the temperature (27) is regulated during operation such that a sensor (28) senses the temperature (27) of the evaporator (25) and transmits it to a regulation unit which correspondingly supplies a heating element (24) with the energy necessary and by which a required pressure (34) of the liquid (8) supplied to the torch (6) is regulated so that an approximately constant temperature (27) of the evaporated liquid (8) is provided for a cutting process.

17 Claims, 4 Drawing Sheets

WATER-STEAM CUTTING PROCESS AND TORCH THEREFOR

CROSS REFERENCE TO RELATED APPLICATIONS

Applicants claim priority under 35 U.S.C. §119 of Austrian Application No. A 1480/2005 filed Sep. 9, 2005. Applicants also claim priority under 35 U.S.C. §365 of PCT/AT2006/000356 filed Aug. 30, 2006. The international application under PCT article 21(2) was not published in English.

The invention relates to a method for transforming a liquid into a gaseous state for a cutting process with a water-steam cutting device, as well as a torch therefor, as defined in the preambles of claims 1 and 16.

Methods for transforming a liquid into a gaseous state for a welding process with a water-steam cutting device are known from the prior art, wherein the liquid is evaporated by the heating-up of a nozzle which returns the heat produced by an electric arc to an evaporator in the torch, whereby the liquid evaporates to a gas.

Here, it is disadvantageous that the liquid is evaporated without an additional heating element, whereby no active temperature regulation is performed. Additionally, the pressure of the liquid evaporated depends on the returned energy, whereby the pressure is not subjected to a regulation either.

Furthermore, a water-steam cutting device is known from EP 1 050 200 B1, wherein a heating element is arranged in the torch. Moreover, the torch includes an evaporator, an energy supply and a supply line for a liquid, wherein an appropriate temperature is necessary for evaporation of the liquid. Here, however, no further details are given on the temperature regulation in the torch.

The object of the invention resides in providing a method and an apparatus, by means of which an active pressure and temperature regulation of the liquid evaporated is possible.

The object of the invention is achieved by a method mentioned above, wherein the temperature is regulated during operation such that a sensor senses the temperature of the evaporator and transmits it to a regulation unit which correspondingly supplies the heating element with the energy required and which regulates a necessary pressure of the liquid supplied to the torch so that an approximately constant temperature of the evaporated liquid is provided for a cutting process.

Furthermore, the object of the invention is also achieved by a torch mentioned above which includes a sensor that senses the heat generated by the heating element and which is connected with a regulation unit for the heating element.

Here, it is advantageous that a quick response behaviour to temperature changes is achieved by the combination of temperature and pressure regulation. Thus, it is possible to quickly react to the different states during a cutting process, irrespective of the application. Likewise, it is thereby achieved that the wear of the wearing parts can be regulated and/or compensated for, whereby those parts can be used longer. Likewise, the wear can be correspondingly indicated.

It is also advantageous that a sensor is integrated into the torch, whereby regulation may occur quickly.

By the measure of permanently providing the heating element with energy, it is advantageously achieved that the heating element generates a constant temperature in the torch and that there is no response time with changes in the energy supply.

By the variably regulated heating element it is advantageously achieved that a low-power heating element can be used. Thus, more power can be provided for the cutting process. Likewise, the size of the torch is substantially reduced by a low-power heating element.

It is also advantageous that temperature variations that occur during the change from the liquid into the gaseous state can be avoided thanks to a stable evaporation zone. Thus, a gas with constant properties is provided for the cutting process.

By the measure that the temperature is regulated via the pressure and that temperature variations can thus be balanced quickly, it is advantageously achieved that an approximately constant temperature is provided for a cutting process. Thus, the cutting properties are considerably improved.

The heating-up time has the advantageous effect that a cutting process with constant temperature can be started sooner.

It is also of advantage that the heating-up time depends on the temperature of the torch, whereby a short heating-up time results from a quick change in the energy supply for the water-steam cutting device and the cutting process can be started quickly.

By the measure of detecting sudden temperature variations, it is advantageously achieved that a cutting process is not suddenly interrupted. Thus, a better result of the cutting process will be obtained.

It is of advantage that the base load is set as a function of the heating-up time, whereby the constant temperature for the cutting process is provided more quickly.

The wear detection has the advantageous effect that the wearing parts can be used longer.

The present invention will be explained in more detail by way of the enclosed schematic drawings.

Therein:

Initially, it is stated that identical parts of the exemplary embodiment are denoted by the same reference numbers.

Figure 1:
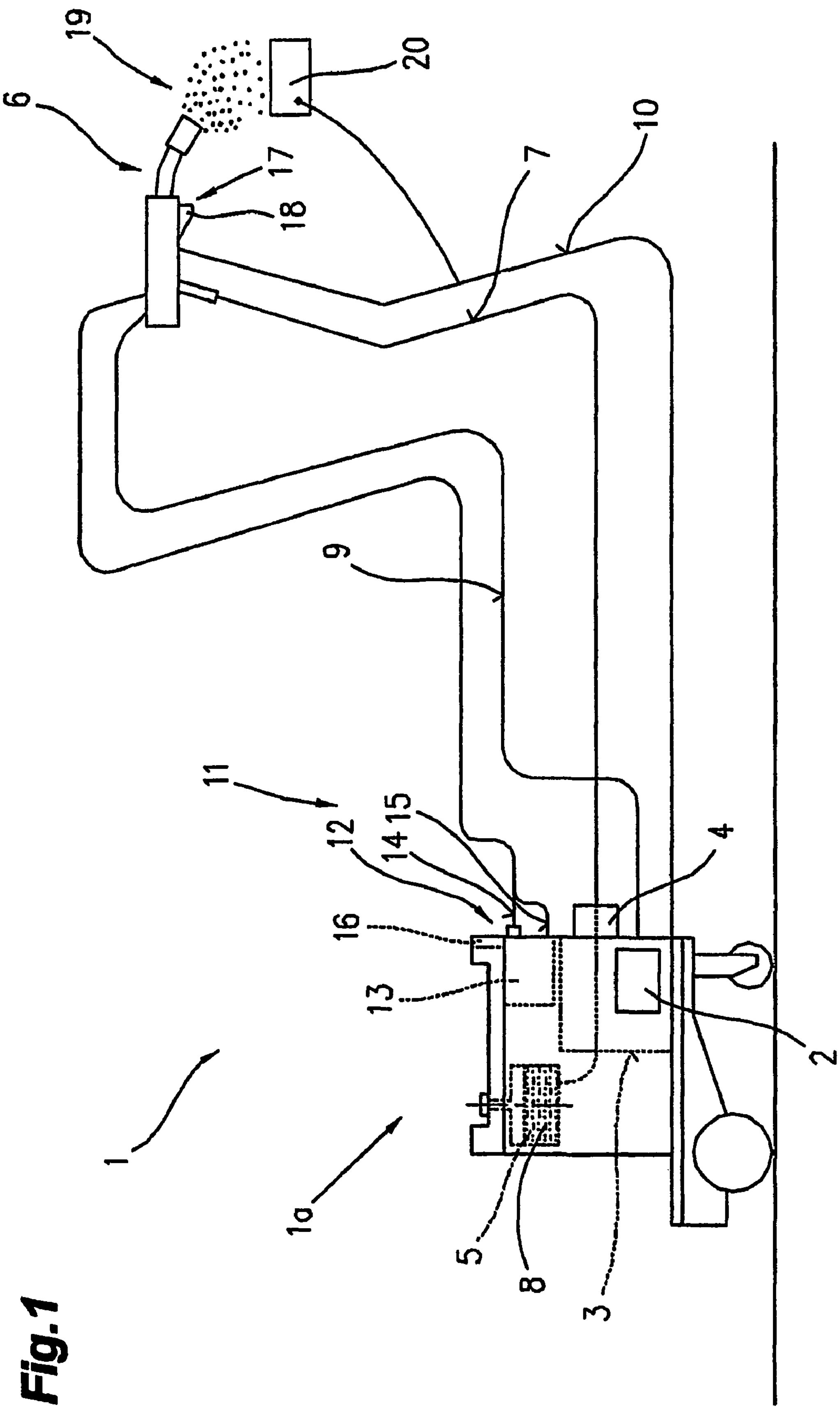
FIG. 1 shows an exemplary representation of a water-steam cutting device.

In FIG. 1, a water-steam cutting device 1 with a basic device 1*a* for a water-steam cutting process is shown. The basic device 1*a* includes a current source 2, a control unit 3 and a blocking element 4 which is assigned to the control unit 3. The blocking element 4 is connected with a reservoir 5 and a water-steam plasma torch 6 via a supply line 7 so that the water-steam plasma torch 6 can be supplied with a liquid 8 provided in the reservoir 5. The water-steam plasma torch 6 is supplied with electrical energy via lines 9, 10 of the current source 2.

For cooling purposes, the water-steam plasma torch 6 is connected with a liquid reservoir 13 via a cooling circuit 11, a flow monitor 12 possibly being interposed. When putting the torch 6 and/or the water-steam cutting device 1 into operation, the cooling circuit 11 can be started by the control unit 3 and cooling of the torch 6 can thus be effected via the cooling circuit 11. To create a cooling circuit 11, the torch 6 is connected with the liquid reservoir 13 via cooling lines 14, 15.

Furthermore, the water-steam cutting device 1 may include an input and/or display device 16 via which the most different parameters and/or modes of operation of the water-steam cutting device 1 can be set and displayed. The parameters set via the input and/or display device 16 are forwarded to the control unit 3 which correspondingly activates the individual components of the water-steam cutting device 1.

Moreover, the water-steam plasma torch 6 may include at least one operating element 17, in particular a button 18. By means of the operating element 17, in particular the button 18, the user can inform the control unit 3 from the torch 6 by activating and/or deactivating the button 18 that a water-steam cutting process is to be started and/or performed. Furthermore, for example, presettings can be adjusted on the input and/or display device 16, in particular the material to be cut, the liquid used and, e.g. the characteristic curves of the current and the voltage can be predefined. Of course, further operating elements can be provided on the torch 6 via which one or several operational parameter(s) of the water-steam cutting device 1 can be adjusted on the torch 6. To this end, these operating elements can be connected with the water-steam cutting device 1, in particular the control unit 3, either via lines directly or via a bus system.

After the button 18 has been actuated, the control unit 3 activates the individual components necessary for the water-steam cutting process. For example, a pump (not illustrated), the blocking element 4 and the current source 2 are activated at first, whereby a supply of the torch 6 with the liquid 8 as well as with electrical energy is introduced. Thereupon, the control unit 3 activates the cooling circuit 11 so that cooling of the torch 6 is rendered possible. By supplying the torch 6 with the liquid 8 and with energy, in particular with current and voltage, the liquid 8 will now be transformed in the torch 6 into a gas 19, in particular into plasma, with high temperature so that a cutting process can be performed on a workpiece 20 by the gas 19 escaping the torch 6.

Figure 2:
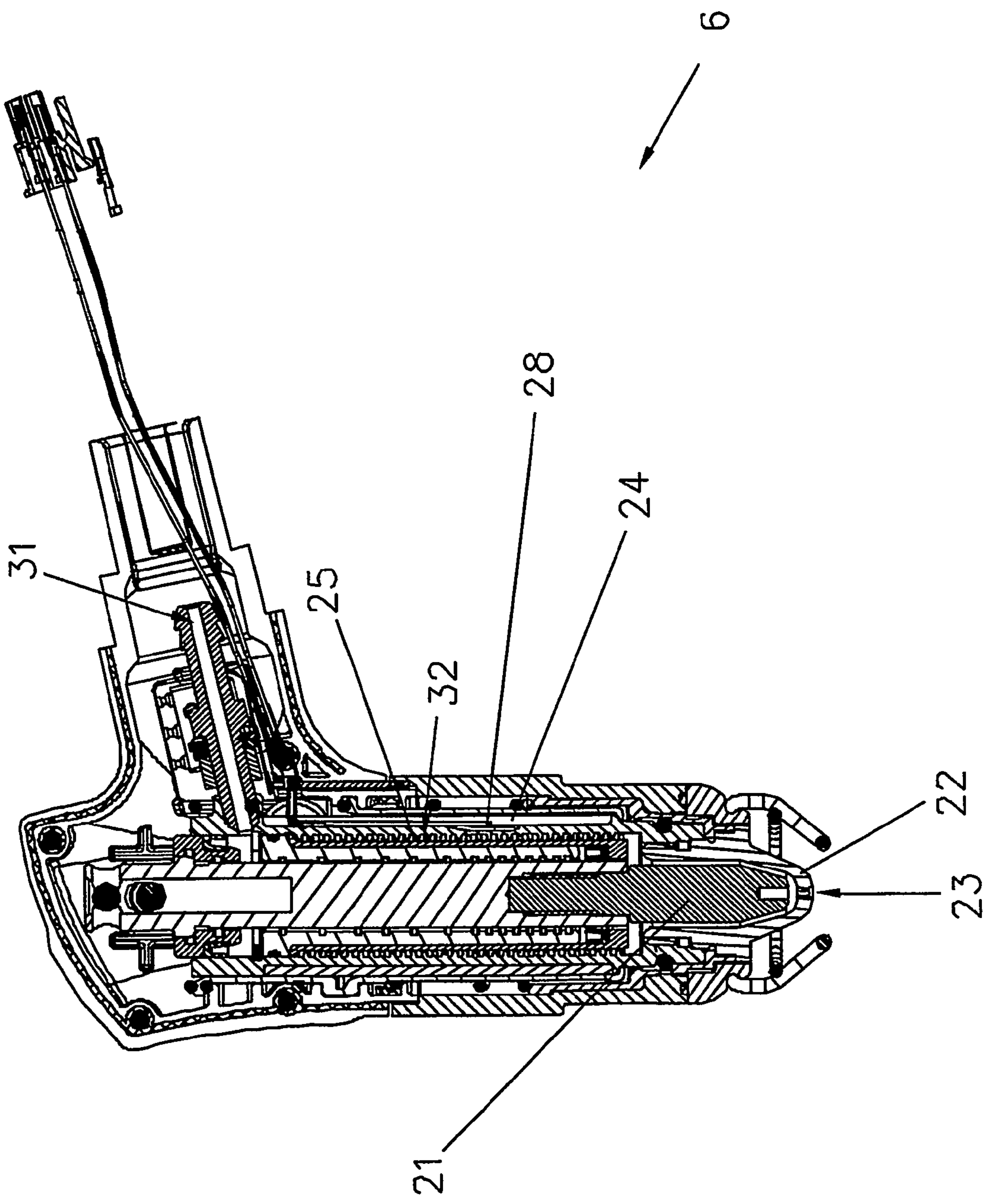
FIG. 2 shows an exemplary representation of the cross-section of the water-steam plasma torch.

An electric arc is additionally necessary for a cutting process on the workpiece 20 using the torch 6, a detailed illustration of which being given in FIG. 2. The electric arc is ignited by the control unit 3 or by actuating the button 18, and burns between a cathode 21, which is integrated into the torch 6 and is preferably connected with the negative pole of the current source 2, and an anode, which is formed by a nozzle 22 and which is connected with the positive pole of the current source 2. If the torch 6 gets closer to the workpiece 20, the positive pole of the current source 2 is switched from the nozzle 22 to the workpiece 20, whereby the electric arc will be pressed outwards by the gas 19 through an outlet opening 23 in the nozzle 22 and will thus burn between the cathode 21 and the workpiece 20. To this end, the current is correspondingly increased by the control unit 4, whereby the workpiece 20 can be separated, e.g.

In order to successfully separate the workpiece 20, an appropriate temperature of the gas 19 is necessary and the gas 19 must be formed from the liquid 8. This is effected by the heat returned by the nozzle 22, as known from the prior art.

According to the invention, the liquid is evaporated via a heating element 24 which is integrated into the torch 6 and is correspondingly supplied with electrical energy and which is connected to a regulation unit. Additionally, the pressure 34 at which the liquid 8 is supplied to the torch 6 is regulated via the regulation unit. Here, an approximately constant temperature of the gas 19 is ensured via the regulation unit. Likewise, a quick response behaviour of the heating element 24 is achieved since the heating element 24 is permanently supplied with energy which can be appropriately changed and/or adapted via the regulation unit.

Basically, the regulation unit is part of the control unit 3 of the water-steam cutting device 1 and comprises a so-called “stand-by operation” and a “cutting operation”.

The “stand-by operation” is activated when the water-steam cutting device 1 is turned on. By turning the latter on, the heating element 24 is provided with the maximum energy, i.e. 100 percent or full heating load, via the regulation unit. Thus, a so-called evaporator 25 is preheated until a certain threshold value 26, e.g. 190° C., has been reached for the temperature 27 of the evaporator 25. This threshold value 26 is sensed by a sensor 28 which measures the temperature 27 of the evaporator 25. The sensor 28 forwards the value sensed to the regulation unit. After the threshold value 26 has been reached, a predefined heating-up time will be started. The latter effects a heat expansion in the torch 6, whereby a constant temperature of the components involved in the cutting process, e.g. the cathode 21, will be reached in the torch 6. Certainly, it would also be possible to integrate several sensors 28 for sensing the heat expansion in the torch 6. The heating-up time is defined via the regulation unit and depends on the temperature 27 of the evaporator 25 present after the water-steam cutting device 1 has been turned on. For example, the heating-up time after reaching the threshold value 26 is shorter when the location is changed after a cutting process and the energy supply of the water-steam cutting device 1 is thus shortly interrupted. If no cutting process is started for a longer time after the water-steam cutting device 1 has been turned on, the temperature 27 of the evaporator 25 is kept on the threshold value 26. This is effected in that the heating element 24 supplies the full heating load 29 for reaching the threshold value 26, and in that it is turned off via the regulation unit after the threshold value 26 has been reached. Thus, a so-called two-point regulator is used for regulating the temperature 27 during the “stand-by operation”.

Likewise, such a two-point regulator is used for the “cutting operation”. Here, however, the heating element 24 is never turned off during normal operation, and the full heating load 29 is reduced to a defined base load 30 or the base load 30 is correspondingly regulated.

If the temperature 27 is below the threshold value 26, the heating element 24 will provide the full heating load 29. But if the temperature 27 is above the threshold value 26, the heating element 24 will provide a certain base load 30. Thus, an approximately constant temperature 27 of the evaporator 25 adjusts, wherein the temperature 27 substantially corresponds to the temperature of the gas 19. Thus, the cutting process can be started, wherein the torch 6 is supplied with the liquid 8 via a supply line 31, and the liquid 8 is evaporated to the gas 19 by the evaporator 25. The area, in which the liquid 8 is trans-formed into the gas 19, i.e. is evaporated, is referred to as so-called evaporation zone 32. To provide the gas 19 with an approximately constant temperature for the cutting process, the evaporation zone 32 should not move and/or migrate in the evaporator 25. This is advantageously achieved by the base load 30 since, due to the base load 30, the heating element 24 is also active above the command value 26, a constant temperature 27 of the evaporator 25 thus being ensured.

Basically, the base load 30 is pulse-width modulated and is regulated preferably between ten and ninety percent during the cutting process. The initial value for the base load 30, i.e. the value for the start of a cutting process, depends on the heating-up time of the torch 6. That is, in case the torch 6 had a lower temperature, i.e. a long heating-up time, when the water-steam cutting device 1 was turned on, a high value will adjust as initial value for the base load 30. In case the torch 6 had a higher temperature, i.e. a short heating-up time, when the water-steam cutting device 1 was turned on, a low value will adjust as initial value for the base load 30. In the further course of the process, the base load 30 adjusts correspondingly. That is, only when turning the water-steam cutting device on, an initial value for the base load 30 is predefined, wherein the base load 30 is regulated and/or adapted during a cutting process.

When starting a cutting process, the base load 30 is regulated, e.g. to eighty percent, whereby an optimum operating temperature of the gas 19 adjusts between 190° C. and 240° C., and whereby a cutting process can be started more quickly. Thus, enough liquid 8 is evaporated to the gas 19 for the cutting process, which gas escapes through the outlet opening 23 of the nozzle 22. Additionally, an electric arc is necessary for the cutting process, which burns between the cathode 21 and the workpiece 20. This is effected by igniting the electric arc between the cathode 21 and the nozzle 22, wherein the electric arc is pressed through the outlet opening 23 onto the workpiece 20 by the gas 19. The burning electric arc has a correspondingly high temperature, whereby in particular the nozzle 22 and the cathode 21 are heated. Those, in turn, convey the heat to the evaporator zone 32, whereby the gas 19 is additionally heated. Thus, the temperature 27, and, consequently, the operating temperature of the gas 19, increase due to the base load 30 of the heating element 24 and the heat returned from the nozzle 22 and the cathode 21. In order that the gas 19 maintains the operating temperature, the base load 30 of the heating element 24 is correspondingly reduced via the regulation unit, e.g. by ten percent. If this reduction of the base load 30 is not sufficient, that is, the temperature 27 of the evaporator 25 and/or the evaporator zone 32, which is sensed by the sensor 28, is still increasing, the base load 30 will be reduced by additional 10 percent, e.g. Thus, the base load 30 is dynamically adapted. This procedure can be repeated correspondingly enough times until the base load 30 has been reduced to a value of ten percent. Since this regulation of the base load 30 is basically slow, this temperature regulation is supported by a pressure regulation and/or combined with the latter.

The pressure regulation is performed in the water-steam cutting device 1, e.g. via a valve 33 (not illustrated) which is integrated into the supply line 31 of the liquid 8. Likewise, it is possible that the pressure regulation is performed in the water-steam cutting device 1, e.g. directly via the pump which supplies the liquid 8 to the torch 6. This valve 33 is correspondingly regulated via the pressure regulation. Basically, the pressure is regulated preferably in the region of between five and seven bar. The pressure 34 of the liquid 8 is correspondingly set via the valve 33. For example, a higher pressure of the liquid 8 has the effect that the increased amount of liquid 8 has to be evaporated at the current temperature 27 of the evaporator 25. In this manner the heat returned from the nozzle 22 and the cathode 21 can quickly be compensated for. Of course, the pressure regulation may also be used for increasing the temperature of the evaporator 25 quickly. This is done in that the pressure 34 of the liquid 8 is reduced. Thus, a smaller amount of liquid 8 is heated at the current temperature of the room 25, whereby the latter is increased. Since pressure regulation occurs quickly, the latter is preferably used at first, i.e. prior to changing the base load 30 via the temperature regulation in order to balance temperature variations during the change of the liquid state of the liquid 8 into the gaseous state of the gas 19. By this combination of temperature regulation with pressure regulation, an approximately constant temperature 27 of the evaporator 25, and thus of the gas 19, is achieved, which has positive effects on the cutting process. Likewise, this regulation combination can balance and/or improve the wear of the nozzle 22 to a certain extent.

For example, the burning electric arc has the effect that the outlet opening 23 of the nozzle 22 is enlarged, whereby more gas 19 escapes through the outlet opening 23, and whereby the temperature 27 of the evaporator 25 decreases. In order to eliminate negative effects thereof on the cutting process, the pressure 34 is correspondingly regulated and/or reduced via the regulation after the change in the temperature 27 has been detected. Thus, the amount of the escaping gas 19 is reduced, whereby the temperature 27 of the evaporator 25 is again increased and is thus kept at an approximately constant level. If the diameter of the outlet opening 23 is further increasing, whereby, in turn, the temperature 27 of the evaporator 25 decreases, the pressure 34 has to be further reduced, e.g. to a minimum value of five bar, after the change in temperature has been detected. Since this minimum pressure 34 of five bar necessary for the cutting process should not be fallen short of, it may happen that the approximately constant temperature 27 of the evaporator 25 may not be achieved. This is prevented by increasing the base load 30, e.g. by 10 percent, via the temperature regulation. Thus, the approximately constant temperature 27 of the evaporator 25 can be ensured. Further wear of the nozzle 22, in turn, results in a reduction of the temperature 27. Since the pressure 34 has already reached the lower threshold value, that is, the minimum value necessary, the temperature decrease can only be balanced by increasing the base load 30. Thus, the approximately constant temperature 27 of the evaporator 25 adjusts again.

This kind of regulation allows also for conclusions as to the wear of the nozzle 22. Thus, based on a low base load and a high pressure, it is detected via the regulation unit that the nozzle 22 is in good or very good state. In the opposite sense, based on a high base load and a low pressure, it is detected via the regulation unit that the nozzle 22 is in a bad or very bad state and must thus be replaced. Accordingly, the wear of the nozzle can also be displayed on the display device 16, e.g.

Figure 3:
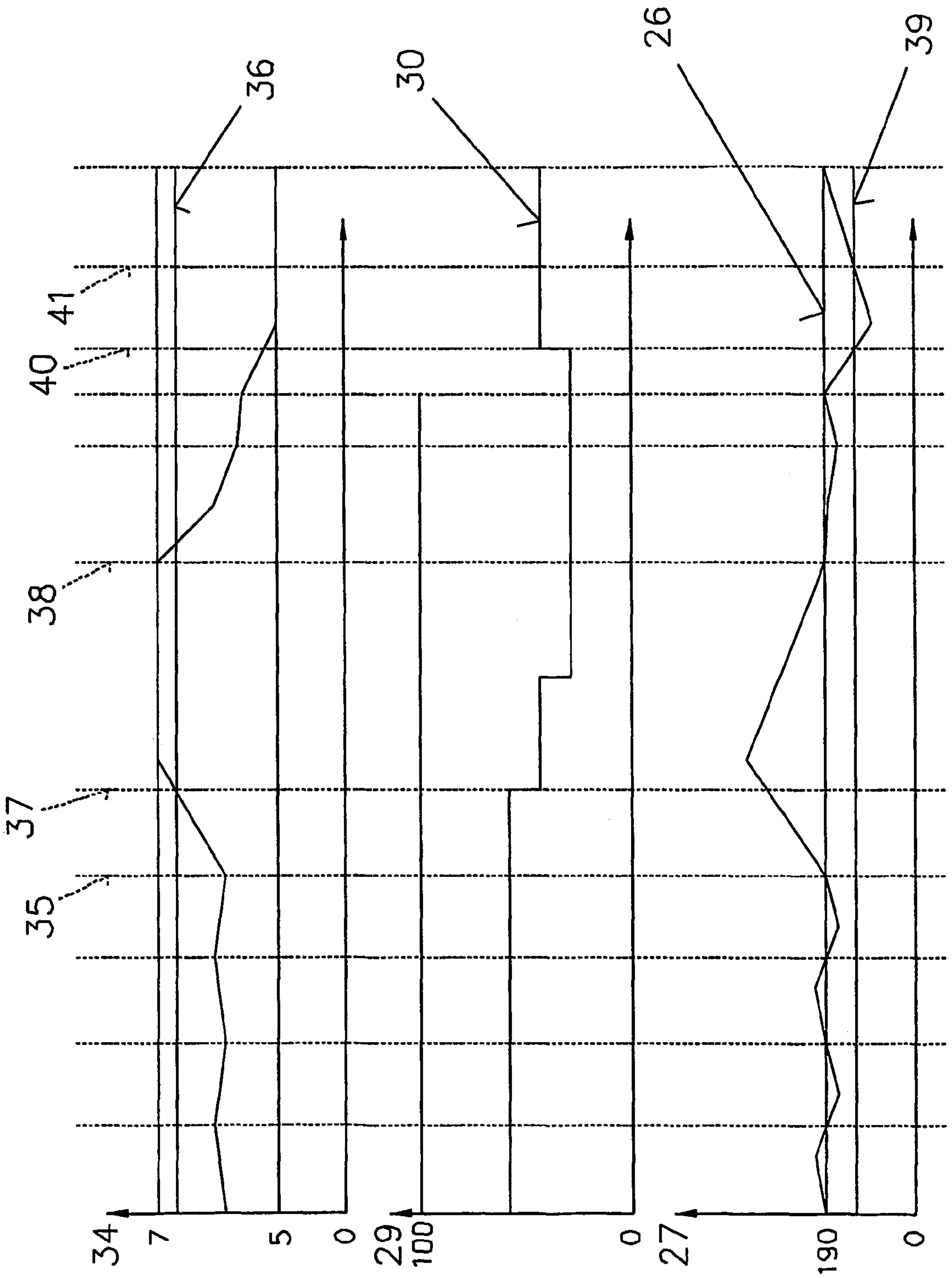
FIG. 3 shows the schematic behaviour of temperature, heating load and pressure during a cutting operation.

In FIG. 3, the pressure and temperature regulation is shown schematically and in an exemplary manner during a cutting process. As can be seen from the diagrams provided for the temperature 27, the heating load 29 and the pressure 34, a cutting process in normal operation is illustrated until the point of time 35. Here, the temperature 27 varies around the command value 26 of the temperature 27, wherein the pressure 34 is regulated to the command value 26 as a function of the temperature 27 and the temperature difference. That is, the temperature 27 is thus regulated via the pressure 34. Furthermore, the base load 30 is preferably kept at a constant level. This means that the pressure 34 basically increases when the temperature 27 is beyond the command value 26 and decreases when the temperature 27 falls short of the command value 26. As can be seen from the point of time 35 onwards, the temperature 27 continuously increases, whereby the pressure 34 is correspondingly increased via the regulation unit in order to reduce the temperature 27 again. If the pressure 34 exceeds an upper threshold value 36 of, e.g. 6.5 bar, as can be seen at the point of time 37, the base load 30 will additionally be reduced, e.g. by ten percent. In order to reduce the temperature 27 again to the command value 26, the pressure 34 remains at its maximum level as can be seen until the point of time 38. As a function of the time between the points of time 37 and 38, that is, from that point of time the temperature 27 exceeded the threshold value 36 until it has reached the command value 26, the base load 30 can be reduced correspondingly several times by further ten percent until the minimum of ten percent has been reached. A further ten-percent reduction of the base load 30 is exemplarily illustrated between the points of time 37 and 38. If the temperature 27 cannot be reduced by these measures and exceeds a value of 240° C., the water-steam cutting device 1 will be turned off by the regulation unit for safety reasons. However, this measure has basically the effect that the temperature 27 reaches the command value 26 or varies around the same, i.e. from the point of time 38 onwards. Here, the pressure 34 is correspondingly adapted, and the base load 30 is kept constantly at the reduced value. If the temperature 27 falls short of a lower threshold value 29 of, e.g. 182° C., the pressure 34 will be correspondingly reduced to the minimum, and the base load 30 will be additionally increased by ten percent so that the command value 26 will be reached as quickly as possible. This measure is illustrated from the point of time 40 onwards. As soon as the threshold value 39 has been again exceeded, as can be seen at the point of time 41, the regulation unit operates as during normal operation. That is, if possible, the pressure 34 is reduced when the temperature 27 has fallen short of the threshold value 26 and the pressure 34 will be correspondingly increased when the temperature 27 is beyond the threshold value 26, wherein the base load 30 is kept constant at the current value.

Likewise, according to the invention, the regulation unit additionally comprises the detection of sudden temperature decreases and the appropriate counteraction.

Figure 4:
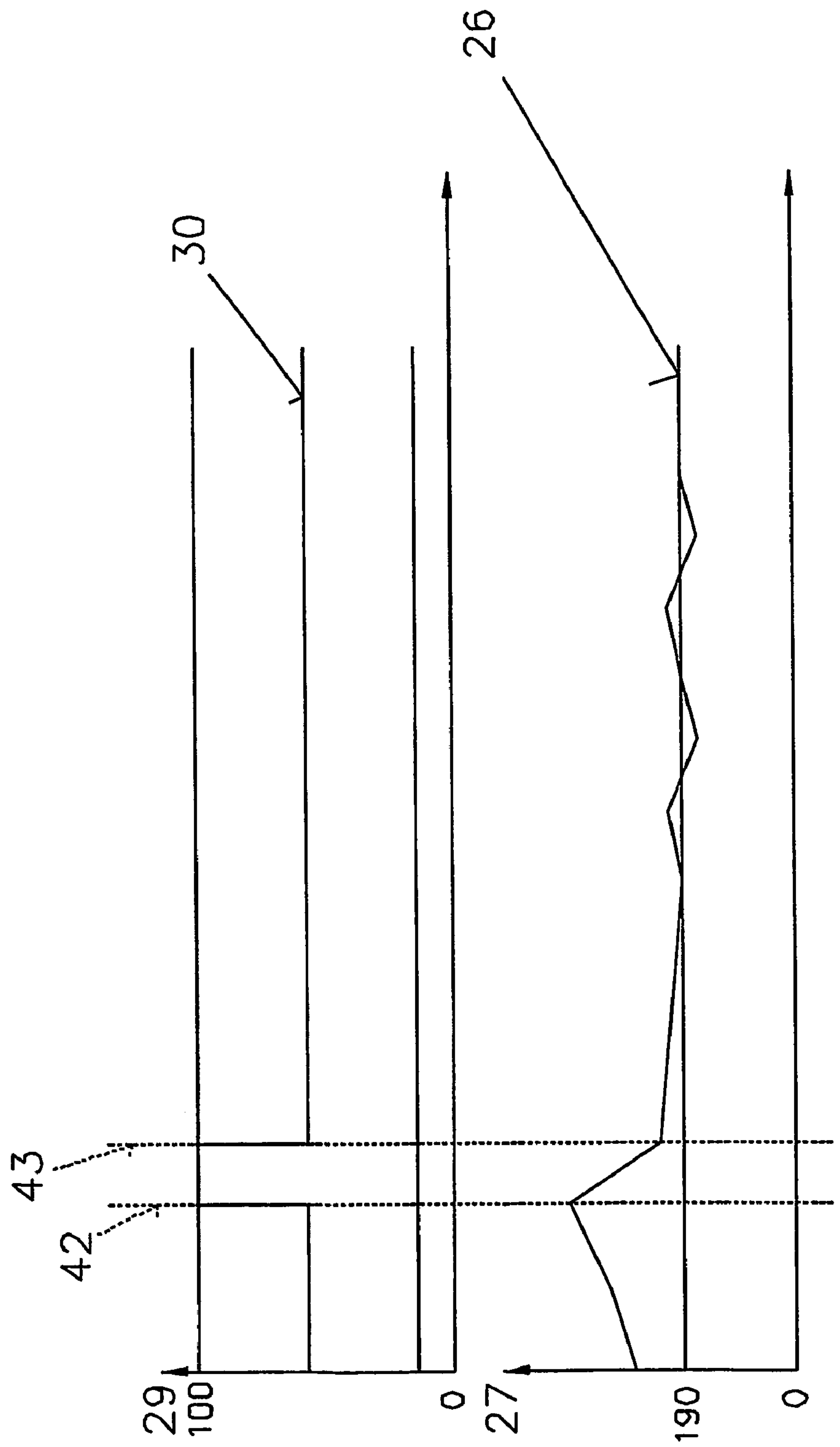
FIG. 4 shows the schematic behaviour of temperature and heating load in the case of a sudden change in temperature.

This is described in more detail by way of the diagrams on the history of a cutting process of FIG. 4. As can be seen from the temperature history, the temperature 27 continuously increases during a cutting process until the point of time 42, wherein it then suddenly decreases. This is illustrated between the points of time 42 and 43. This temperature decrease of, e.g. 40° C. per second is detected via the regulation unit and appropriate measures are taken, i.e. the temperature 27 is regulated via the pressure 34, as already known. Additionally, the base load 30 is increased to the full heating load 29 at the point of time 42. Thus, the sudden temperature decrease is damped and the constant temperature 27 of the evaporator 25 adjusts again. The full heating load 29 is applied until that point of time that the temperature decrease has been damped, as can be seen from the point of time 43 onwards. Thus, the base load 30 is again reduced to its original value. Of course, it is also possible that the base load 30 is increased to the full heating load 29 over a longer period of time so that the approximately constant temperature 27 of the evaporator 25 adjusts. Thus, it is advantageously prevented that the threshold value 26 of the temperature 27 is reached with too high a slope. This could have the consequence that the decrease in temperature can no longer be reduced via the regulation unit, whereby the temperature 27 falls, e.g. below 170° C. and the water-steam cutting device 1 will automatically turn off. Likewise, said regulation unit can be unnecessary when the temperature 27 is close to the maximum temperature of, e.g. 240° C.

Preferably, the pressure and temperature regulation is done by a microcontroller, in particular by a microcontroller of the control unit 3 of the water-steam cutting device 1.

The invention claimed is:

1. A method for transforming a liquid (8) into a gaseous state for a cutting process comprising the steps of providing a water-steam cutting device (1), consisting of a torch (6), which includes a heating element (24), an evaporator (25), an energy supply and a supply line (31) for a liquid (8), generating an appropriate temperature (27) for evaporation of the liquid (8), controlling the temperature (27) during operation such that a sensor (28) senses the temperature (27) of the evaporator (25) and transmits it to a regulation unit which correspondingly supplies the heating element (24) with the energy required and by which a required pressure (34) of the liquid (8) supplied to the torch (6) is regulated so that an approximately constant temperature (27) of the evaporated liquid (8) is provided for a cutting process; and wherein the energy required for the heating element (24) is variably regulated and the heating element (24) is thus permanently supplied with energy, with a variable base load (30), during operation.

2. The method according to claim 1, wherein preferably a base load (30) of from between 10 and 90 percent is generated by the heating element (24) during operation.

3. The method according to claim 1, wherein the pressure (34) is regulated to a threshold value (26) as a function of the temperature.

4. The method according to claim 1, wherein a stable evaporator zone (32), in which the liquid (8) changes into its gaseous state, is achieved by the variable base load (30) and/or heating load (29).

5. The method according to claim 1, wherein the regulation of the pressure (34) is used for balancing temperature changes quickly.

6. The method according to claim 1, wherein the heating element (24), i.e. the base load (30), is used for long-term temperature changes.

7. The method according to claim 1, wherein sudden variations of the temperature (27) are detected and balanced via the regulation unit.

8. The method according to claim 7, wherein sudden temperature variations are balanced by increasing the base load (30) to the maximum heating load (29).

9. The method according to claim 1, wherein a heating-up time is started after the water-steam cutting device (1) has been turned on and after the threshold value (26) of the temperature (27) has been reached.

10. The method according to claim 9, wherein the heating-up time is set as a function of the temperature (27) of the torch (6) and/or the evaporator (25).

11. The method according to claim 9, wherein an initial value is set for the base load (30) for a cutting process as a function of the heating-up time.

12. The method according to claim 1, wherein the wear of one or several component(s) of the torch (6) is detected based on the temperature values and pressure values.

13. The method according to claim 12, wherein the wear of a nozzle (22) is detected.

14. The method according to claim 1, wherein the regulation is performed by the control unit (3) of the water-steam cutting device (1).

15. A torch for transforming a liquid (8) into a gaseous state for a cutting process with a water-steam cutting device(1), with an evaporator (25), an energy supply and a supply line (31) for a liquid (8), wherein an appropriate temperature (27) is required for evaporation of the liquid (8), and a heating element (24) is integrated into the torch (6), wherein a sensor (28) is provided which senses the heat generated by the heating element (24) and which sensor (28) is connected with a regulation unit provided for the heating element (24).

16. The torch according to claim 15, wherein the heating element (24) has a low power input.

17. The torch according to claim 16, wherein the low power input allows for a compact construction of the torch (6).

* * * * *